(12) United States Patent
Samokhin et al.

(10) Patent No.: US 9,134,138 B2
(45) Date of Patent: Sep. 15, 2015

(54) NAVIGATION DEVICE, METHOD OF OUTPUTTING A MAP, AND METHOD OF GENERATING A DATABASE

(75) Inventors: Viktor Samokhin, Ovidiopol (UA); Vladimir Ivanov, Munich (DE); Alexey Pryakhin, Munich (DE); Carsten-Christian Spindler, Karlsruhe (DE); Stavros Mitrakis, Kirchheim-Heimstetten (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 354 days.

(21) Appl. No.: 13/598,187

(22) Filed: Aug. 29, 2012

(65) Prior Publication Data

US 2013/0050204 A1 Feb. 28, 2013

(30) Foreign Application Priority Data

Aug. 29, 2011 (EP) .................................... 11179164

(51) Int. Cl.
*G06T 15/00* (2011.01)
*G01C 21/36* (2006.01)
*G06T 17/05* (2011.01)
*G06T 17/00* (2006.01)

(52) U.S. Cl.
CPC ............ *G01C 21/3638* (2013.01); *G06T 17/05* (2013.01); *G06T 17/005* (2013.01)

(58) Field of Classification Search
CPC ......... G06T 19/00; G06T 17/00; G06T 17/20; G06T 15/00

USPC .................................. 345/419; 715/835, 762
See application file for complete search history.

(56) References Cited

U.S. PATENT DOCUMENTS

| 6,252,605 | B1* | 6/2001 | Beesley et al. ................ 345/441 |
| 7,746,343 | B1 | 6/2010 | Charaniya |
| 8,013,854 | B2* | 9/2011 | Delarue et al. ................ 345/420 |
| 2002/0123841 | A1 | 9/2002 | Satoh et al. |
| 2007/0073475 | A1 | 3/2007 | Endo |
| 2010/0146436 | A1 | 6/2010 | Jakobson |
| 2012/0059720 | A1* | 3/2012 | Musabji et al. ............ 705/14.58 |

FOREIGN PATENT DOCUMENTS

JP 2005266704 9/2005

OTHER PUBLICATIONS

Guttman, "R-Trees", Proceedings of the 1984 ACM Sigmod International Conference on Management of Data, 1984, p. 47.

* cited by examiner

*Primary Examiner* — Kimbinh T Nguyen
(74) *Attorney, Agent, or Firm* — O'Shea Getz P.C.

(57) ABSTRACT

A navigation device comprises a processing device and a database. The database may store first data defining, for a plurality of objects, respectively a three-dimensional representation of the object. The database may store second data including, for at least a subset of the plurality of objects, an icon representation of the respective object, coordinates of the respective object and a pointer to a portion of the first data which is associated with the respective object. The processing device is coupled to the database and is configured to control an optical output device to display an object based on the first data or based on the second data.

14 Claims, 8 Drawing Sheets

NAVIGATION DEVICE, METHOD OF OUTPUTTING A MAP, AND METHOD OF GENERATING A DATABASE

1. CLAIM OF PRIORITY

This patent application claims priority from EP Application No. 11 179 164.6 filed Aug. 29, 2011, which is hereby incorporated by reference.

2. FIELD OF TECHNOLOGY

Embodiments of the invention relate to a navigation device comprising a database storing data which define three-dimensional structures, to a method of outputting a map and to a method of generating a database. Embodiments of the invention relate in particular to such devices and methods in which three-dimensional representations of at least some objects, such as landmarks, may be output using data stored in the database.

3. RELATED ART

Optical output devices are widely used in navigation devices. Such output devices may be used for outputting electronic maps. Since electronic maps may be displayed on screens of small and/or portable devices, they have the advantage of being versatile and compact. Data displayed on electronic maps may be easily modified and adapted, e.g., by changing the zoom level of the map portion displayed, by displaying additional objects that might be of relevance to the user, such as directional arrows indicating a direction change in a navigation device, or by highlighting objects that may be of relevance to the user.

Three-dimensional maps may be of particular value to the user owing to their high recognition quality. The recognition of locations, such as a street intersection, may be facilitated when a three-dimensional map is output, as compared to a conventional two-dimensional representation. Certain objects, such as certain buildings or other landmarks, may be included in three-dimensional maps or city models output to a user.

Generally, various formats may be used to define three-dimensional representations of objects. For illustration, triangulated irregular networks (TINs) may be used. While such formats afford a high versatility, they need to be processed at run time. This may be costly in terms of computation time and/or computation resources, in particular when 3D rendering must be performed for a large number of objects. Alternatively or additionally, pre-stored images may be used which can be output with little consumption of computational resources or computation time. It may be challenging to combine the outputting of full three-dimensional representations, using TINs or similar, and the outputting of pre-stored images, while avoiding problems associated with computation time and/or computation resources.

There is a need for navigation devices and methods which allow high quality three-dimensional representations of objects to be generated, while mitigating problems associated with long processing times which may occur when a large number of such objects are present.

SUMMARY OF THE INVENTION

A navigation device according to an embodiment comprises a database and a processing device coupled to the database. The database stores first data defining, for a plurality of objects, respectively a three-dimensional representation of the object. The database also stores second data including, for at least a subset of the plurality of objects, an icon representation of the respective object, coordinates of the respective object and a pointer to a portion of the first data which is specifically associated with the respective object. The processing device is configured to control an optical output device based on the first data and the second data.

By using the database including the first data and the second data, a representation of the object may be selectively generated using either the full three-dimensional representation defined by the first data or the icon representation included in the second data. Icon representations included in the second data may be used in cases where a larger number of objects must be displayed, such as at zoom levels at which a large geographical area is to be displayed. With the second data storing, for plural objects, respectively a pointer to the portion of the first data which is associated with this object as well as a geo-referenced icon representation, the time required to generate the full three-dimensional representation may be reduced by using the pointer to retrieve information from the first data once the icon representation has been displayed.

As used herein, the term "icon" or "icon representation" refers to an image representation of the respective object. That is, the "icon" or "icon representation" is an image of the object suitable for outputting, without requiring three-dimensional rendering to be performed. The "icon" or "icon representation" may have any one of a variety of formats, such as bitmap, tagged image file format, portable network graphics, jpeg data, or any one of a variety of other formats.

The objects may in particular include landmarks. For a plurality of landmarks, three-dimensional representations may be stored in the first data and geo-referenced icon representations may be stored in the second data.

The map which is output may be a three-dimensional map. When an object is displayed using the second data, the icon may be positioned on the map based on the coordinates. The icon representation may be displayed independently of a viewing angle on the scene, i.e., the icon representation may be output such that it is not adjusted as a function of viewing angle.

The pointer included in the second data may respectively be a pointer which references an entry of a table of the first data, which entry includes only data associated with the respective object.

The processing device may be configured to access, for an object included in the subset, the first data using the pointer included in the second data, so as to retrieve data defining the three-dimensional representation. This allows access times to be reduced when an object has first been output as an icon representation and a more detailed representation is to be output on demand.

The processing device may be configured to alter the control of the optical output device as a function of a zoom level of a displayed map, so as to switch, as a function of the zoom level, between the icon representation and the three-dimensional representation for an object. A pre-determined criterion other than zoom level may be used to trigger a transition between the displaying of the icon representation and the displaying of the three-dimensional representation of the respective object. The optical output device may be controlled such that, for an object, either the icon representation or the three-dimensional representation is shown at any given time, while the icon representation and the three-dimensional representation for the same object are never displayed simultaneously.

The processing device may be configured to monitor a pre-determined criterion and to selectively control the optical output device to display the icon representation for an object, or to display the three-dimensional representation for the object, depending on whether the pre-determined criterion is fulfilled. When the map is initially output, a decision may be made on whether the full three-dimensional representation obtained by 3D rendering or the less complex icon representation is to be output. The map may be updated based on whether the pre-determined criterion is fulfilled at later stages, after an initial map has been output.

The pre-determined criterion may be based on a zoom level, i.e., based on a scale at which the map is output. For upper zoom levels, where a large geographical area is to be displayed, the optical output device may be controlled so that the map includes the icon representations for the objects located in the geographical area. For zoom levels at which only a smaller geographical area is to be displayed, more authentic three-dimensional representations may be generated using the first data. In the latter case, 3D rendering may be performed. Information on the three-dimensional representations may be selectively retrieved from the first data for a fraction of the objects shown as icons in the initial map. This further reduces processing times. This allows rendering to be performed on demand, only when required.

The processing device may be configured to control, in response to a change in zoom level, the optical output device to hide the icon representation and to display the three-dimensional representation for the object. This allows the map to be updated in response to a change in zoom level.

The processing device may be configured to control the optical output device to display the icon representations for plural objects, and to retrieve data defining the three-dimensional representation for only a fraction of the plural objects in response to a change in zoom level. By selectively discarding objects for which icon representations are shown when zooming into a given area, spurious retrieval of information from the first data may be avoided. For all other objects, which are to be displayed after zooming into the area, the pointers stored in the second data may be used to retrieve the information on the three-dimensional representations of the objects from the first data.

When icon representations are displayed for one or plural objects, the icon representations may be retrieved from the second data based on the coordinates included in the second data. With the icon representations being geo-referenced, the map may be efficiently generated at upper zoom levels.

The processing device may be configured to control the optical output device such that an icon representation defined by the second data is shown for at least one object, and a rendered 3D object representation defined by the first data is shown for another object. That is, icons and rendered 3D object representations may be shown simultaneously on a map.

The first data may include an index structure having a plurality of nodes. For each entry in the second data, the pointer may respectively be a pointer to a node of the index structure which is different from a root node. This reduces or eliminates search times, as it is not required to search through the index structure starting at the root node.

The index structure may include an R-tree. This allows three-dimensional representations to be efficiently generated.

The pointer may be a pointer to a leaf node of the index structure. This reduces or eliminates search times, because it is not required to search through the index structure starting at root node.

The second data may include at least one table. The second data may include a table with entries which include, for each object for which an icon representation is stored, geo-coordinates and a pointer to the portion of the first data which is associated with this object. The table may further include the icons for the various objects, or icon identifiers.

The second data may have a first table and a second table. The first table may include, for each object for which an icon representation is stored, geo-coordinates, an icon identifier and a pointer to the portion of the first data which is associated with this object. The second table may store icons. When different objects are represented by the same icon, the same icon identifiers may be used. It is not required to store the image data representing the icon in duplicate. Storage space requirements may be reduced.

Different icons may be stored in the second data for at least some of the objects. For illustration, a day view image and a night view image may be stored for an object. In this case, the first table may include, for each object, plural icon identifiers identifying the plural icons.

The first data may also include one or several tables. The first data may be formed as, or may be comprised by, a relational database.

The navigation device may comprise an optical output device coupled to the processing device. The processing device may control the optical output device based on the first data and the second data.

The navigation device may be a vehicle navigation device. The vehicle navigation device may be removably or fixedly installed in a vehicle.

According to another embodiment, a database for a navigation device is provided. The database stores first data defining, for a plurality of objects, respectively a three-dimensional representation of the object. The database also stores second data including, for at least a subset of the plurality of objects, an icon representation of the respective object, coordinates of the respective object and a pointer to a portion of the first data which is associated with the respective object.

By using the database including the first data and the second data, a representation of the object may be selectively generated using either the full three-dimensional representation defined by the first data or the icon representation included in the second data. With the second data storing, for plural objects, respectively a pointer to the portion of the first data which is associated with this object, processing times may be reduced when rendering is to be performed on demand after an icon representation has been displayed.

The database may be stored on a non-transitory storage medium.

According to another embodiment, a method of outputting a map using a database is provided. At least one object to be displayed on the map is identified. Information is selectively retrieved from first data or from second data stored in the database, the first data including three-dimensional representations of objects, and the second data including, for at least a subset of the objects, a geo-referenced icon representation for the respective object and a pointer to a portion of the first data which is associated with the respective object. An optical output device is controlled based on the retrieved information.

Additional features which may be used in the method, and effects attained thereby, to the features and effects of the navigation devices of embodiments.

In the method, for visualization of an object on upper zoom levels, it is not required to load each full three-dimensional representation to retrieve all related information for rendering. Appropriate icons may be selected based on geo-position and may be displayed. Upon demand, information on the full three-dimensional representation may be retrieved using the pointer. Loading excessive amounts of three-dimensional object data during zoom operations may be avoided.

In the method, a pre-determined criterion may be monitored to determine whether a representation of the object is to be generated based on the first data, after an icon representation has been output. A portion of the first data may be selectively accessed using the pointer stored in the second data for the object when it is determined that 3D rendering is to be performed.

A zoom level may be monitored to determine whether the map is to be updated based on the first data, thereby allowing the map to be updated as structures are to be shown at a greater level of detail upon demand.

The method may be performed using the navigation device of any one aspect or embodiment.

According to another embodiment, a computer program is provided which comprises instruction code which, when executed by a processing device of a navigation device, directs the navigation device to perform the method of outputting a map of any one aspect or embodiment.

According to another embodiment, a method of generating a database for a navigation device is provided. First data defining, for a plurality of objects, respectively a three-dimensional representation of the object are stored in the database. For each object of at least a subset of the plurality of objects, a portion of the first data associated with the respective object is identified. A geo-referenced icon representation of the respective object and a pointer to the identified portion are stored in the database.

This method allows a database to be generated which can be used in the navigation device and in the method of outputting a map according to embodiments.

In the method, a table may be generated which includes, for plural objects, at least the following entries: geo-coordinates of the object; an icon or an identifier for an icon; and the pointer to the portion of the first data which is associated with the respective object.

When icon identifiers are used in the table, another table may be generated which stores the icons.

An index structure may be generated for the first data. The pointer to the portion of the first data may be a pointer to a node of the index structure associated with the respective object. The pointer to the portion of the first data may be a pointer to a node different from a root node of the index structure. The pointer to the portion of the first data may be a pointer to a leaf node of the index structure. Thereby, efficient retrieval of information from the first data is facilitated.

The table which includes geo-coordinates of objects, pointers to the first data, and icons or icon identifiers may be generated at compile-time of the database. Thereby, processing at run-time may be reduced.

The database may be generated as a relational database.

The database may be used in the navigation device or the method of outputting a map according to any one aspect or embodiment. The database may be stored in a navigation device, and the navigation device may use the database to automatically perform a method of outputting a map according to an embodiment.

It is to be understood that the features mentioned above and those to be explained below can be used not only in the respective combinations indicated, but also in other combinations or in isolation.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

The foregoing and other features of embodiments will become more apparent from the following detailed description of embodiments when read in conjunction with the accompanying drawings. In the drawings, like or identical reference numerals refer to like or identical elements.

DETAILED DESCRIPTION OF THE INVENTION

Figure 1:
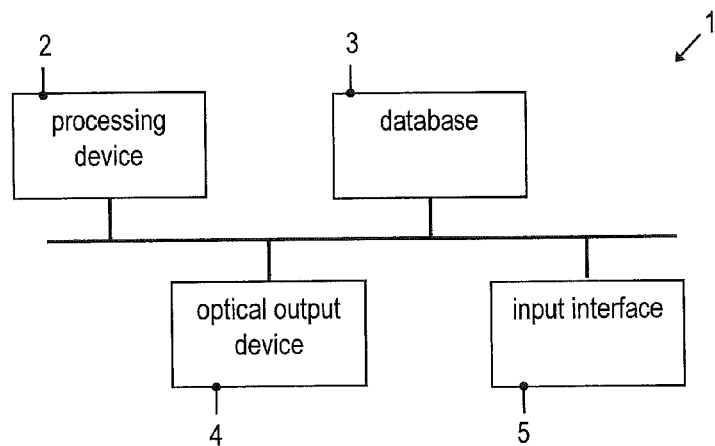
FIG. 1 is a block diagram illustration of a navigation device of an embodiment.

FIG. 1 is a block diagram illustration of a navigation device 1 according to an embodiment. The navigation device 1 comprises a processing device 2 which controls the operation of the navigation device 1. The processing device 2 may comprise a central processing unit, for example in form of one or more microprocessors, digital signal processors or application-specific integrated circuits. The processing device 2 may also include a graphics processor. The navigation device 1 further includes a database 3 stored in a storage device. The storage device may comprise any one, or any combination, of various types of memory, such as random access memory, flash memory or a hard drive, but also removable memories such as a compact disk (CD), a DVD, a memory card or the like. The navigation device 1 also includes an output interface for outputting information to a user. The output interface includes an optical output device 4. The navigation device 1 may also include an input interface 5.

The navigation device 1 may include additional components, such as a position sensor and/or a wireless receiver and/or a vehicle interface. The position sensor may be adapted to determine the current position of the vehicle in which the navigation device 1 is installed. The position sensor may comprise a Global Positioning System (GPS) sensor, a Galileo sensor, a position sensor based on mobile telecommunication networks and the like. The wireless receiver may be configured to receive information for updating the map database stored in the storage device 3. The vehicle interface may allow the processing device 2 to obtain information from other vehicle systems or vehicle status information via the vehicle interface. The vehicle interface may for example comprise controller area network (CAN) or Media Oriented devices Transport (MOST) interfaces.

The storage device stores a database 3 for use in outputting electronic maps. The database may include information for performing route search and route guidance. The database also includes information for outputting three-dimensional (3D) maps. The database includes information on 3D representations of objects as well as icons for at least some of the objects. The objects may, for example, be landmarks. In operation of the navigation device 1, the processing device 2 controls the output interface 4 to output an object. As will be described in more detail, rendering may be performed to display an object or an icon may be displayed instead of a rendered 3D object representation. Depending on a zoom level, or scale, to which the map is shown, and/or depending on other criteria, 3D rendering or simple outputting of an icon may be performed to display object(s). The icons may have any one of a variety of formats, such as bitmap, tagged image file format, jpeg, portable network graphics, or similar.

Figure 2:
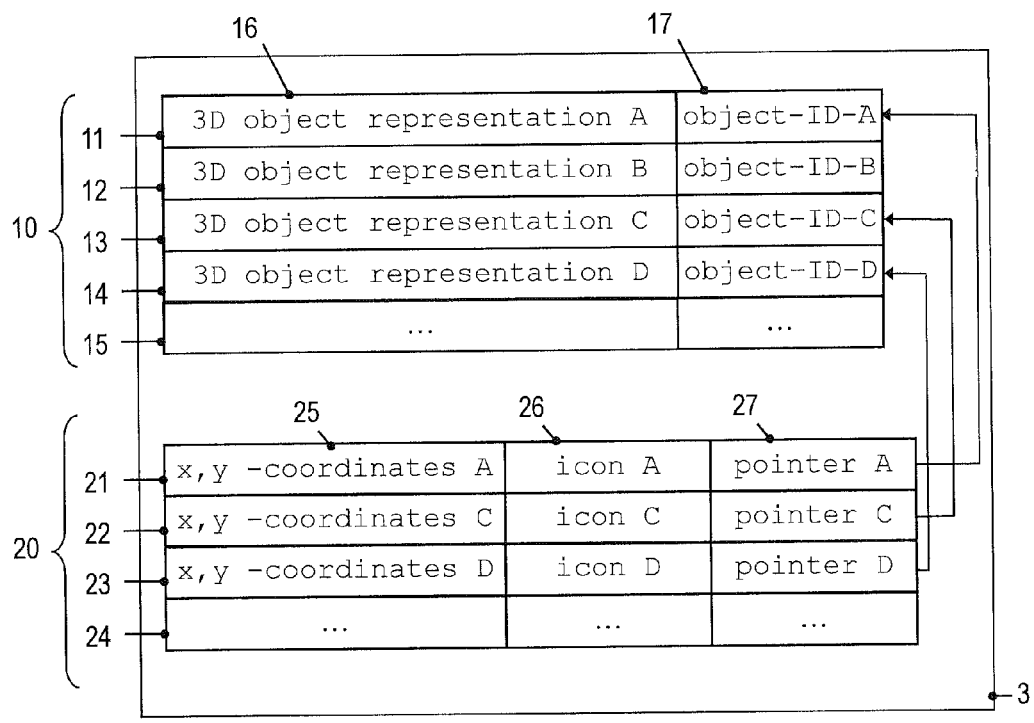
FIG. 2 is a schematic representation of a database of an embodiment.

FIG. 2 is a schematic representation of a database 3. The database 3 may be used in the navigation device 1 of FIG. 1.

The database 3 includes first data 10 and second data 20. Generally, the first data 10 define, for a plurality of objects, respectively a three-dimensional representation of the object. The objects may be landmarks. The second data 20 include, for at least a subset of the plurality of objects, a geo-referenced icon representation of the respective object. Additionally, the second data 20 include pointers to the first data. For an object for which a geo-referenced icon representation is stored in the second data, the pointer is a reference to a portion of the first data which relates to this object. In other words, the second data include a reference to the parent object in the first data, in addition to the geo-referenced icon representation. The pointer may point to an entry of a table of the first data, which only includes data for the respective object.

The database 3 may include a plurality of tables, as schematically illustrated in FIG. 2. The database 3 may be a relational database.

The first data 10 include entries 11-14, each of which is associated with an object. There may be additional entries 15. The number of entries in the table may be selected in accordance with the number of different objects or the number of different three-dimensional object shapes. The first data 10 defines 3D object representations for the plurality of objects. The 3D object representation stored in the first data, as indicated at 16 for an object labelled "A", may have any one of a variety of formats. For illustration, the 3D object representation may define a triangulated irregular network (TIN) or another surface mesh. When the 3D object representation defines a TIN, the TIN may be stored as a triangle strip to reduce storage space requirements. The first data 10 may also include an object identifier 17 for the respectively represented object. Other formats of the first data 10 may be used. For illustration, the first data 10 may include a table storing the 3D object representations, and another table storing other data associated with the plurality of objects. Entries of the other table may respectively reference entries of the table storing the 3D object representations.

The second data 20 include entries 21-23, each of which is associated with an object. There may be additional entries 24. The number of entries in the table may be selected in accordance with the number of different objects for which an icon representation is stored in the database.

For at least some objects, the database 3 stores both a 3D object representation and an icon representation. In some implementations, the second data 20 may define a geo-referenced icon representation for each object for which the first data 10 store a 3D object representation. In other implementations, the second data 20 may define a geo-referenced icon representation for only a subset of the objects for which the first data 10 stores a 3D object representation. For illustration, for geographical areas in which the number of landmarks per unit area is less than a threshold, it may not be required to also store a geo-referenced icon representation in addition to the 3D object representation. The second data 20 may include additional data, such as icon representations for objects for which no 3D object representation is stored in the first data 10. For the latter objects, the second data 20 do not include a pointer to the first data 10.

The second data 20 respectively include the following entries for an object: coordinates 25 defining the geo-position of the respective object; information 26 on an icon representation; and a pointer 27 that specifically points to a section of the first data associated with this object. As will be described in more detail with reference to FIGS. 7 and 8, the information 26 may be image data, for example a bitmap image, or may reference an image which is not stored in the table, but which is stored separately in the second data.

The icons generally are images for which no rendering must be performed. The icons may be displayed without requiring 3D rendering. Some or all of the icons may show the associated object in perspective views, but the format of the icons does generally not allow the perspective views to be adapted when a viewing direction is altered in a geo-frame.

The icon representations may be selected such that the amount of data required to define the icon is, at least one average, less than the amount of data required for the full 3D object representation. Thereby, overhead storage space requirements may be kept moderate.

In operation of the navigation device, when a three-dimensional map is to be output, it is determined whether 3D rendering is performed using the first data 10 to display an object or whether the icon representation is output. The decision may be taken based on any one of a variety of criteria. The criteria may include any one, or any combination, of the following: zoom level, distance of the object from point of view, user input demanding a rendering of the 3D object representation. The map may also be updated by monitoring the criteria. For illustration, a zoom level may be monitored. As the zoom level changes, in response to a user action or automatically during route guidance, icon representations may be hidden and 3D rendering may be performed for those objects which remain visible at the new map scale.

Figure 3:
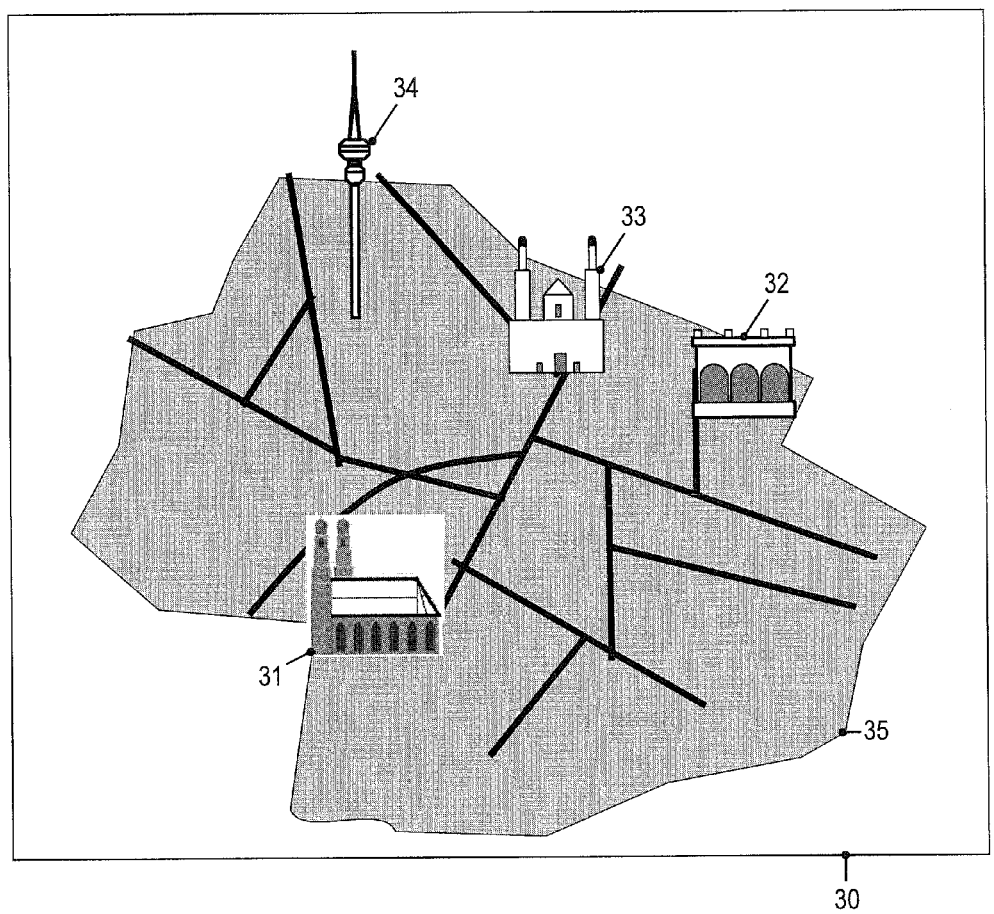
FIG. 3 is a pictorial representation of a map output by the navigation device of an embodiment.

FIG. 3 illustrates an electronic map 30 which may be output over the optical output device 4 of the navigation device 1. The map includes a pictorial representation 35 of a road network. The pictorial representation 35 may be generated as a 3D view, using a perspective projection, to thereby generate a 3D-type map. The map includes icons 31-34 representing various objects. The objects are landmarks, such as churches, towers, or other points of interest. The icons 31-34 are selected from the second data 20, based on the object coordinates stored in the second data 20. The icons 31-34 are positioned on the map 30 based on the object coordinates indicated in the second data 20.

Owing to the format of the icons which are stored as images, the icons 31-34 are not necessarily shown in a perspective view which matches that of the pictorial representation 35 of the road network. However, the position of the icons 31-34 reflects their position relative to the road network, thereby aiding navigation at upper zoom levels where the geographical area represented by the map 30 is large and a realistic perspective representation of landmarks may not be required.

As no 3D rendering must be performed for an object which is shown as an icon, processing times and/or the required computational resources may be reduced at zoom levels at which many different objects may need to be displayed.

The second data may include plural icons for an object. For illustration, there may be an icon for a day view and another icon for night view, respectively for the same object. The icon which is shown on the map 30 may be selected as a function of daytime.

When a map as shown in FIG. 3 is displayed, 3D rendering may be performed on demand to display objects in a more realistic way. This may be done as the zoom level is altered. Similarly, 3D rendering for one or several objects may be performed in response to a dedicated user request. 3D rendering for one or several objects may also be performed as the distance between the point of view and the object becomes less than a threshold, even when the zoom level is such that many landmarks may still be located in the geographical area represented by the map 30.

Figure 4:
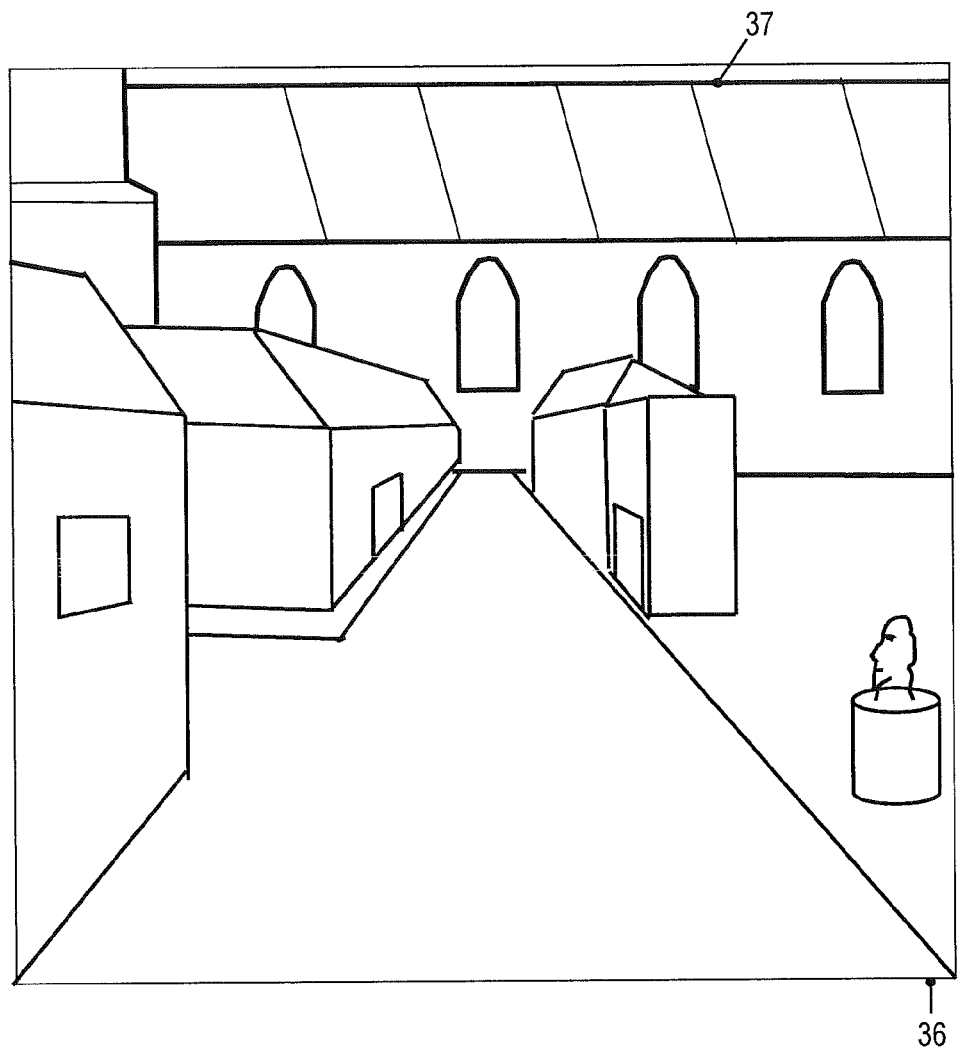
FIG. 4 is a pictorial representation of a map output by the navigation device for another zoom level.

FIG. 4 illustrates an electronic map 36 which may be output over the optical output device 4 (FIG. 1). A map as shown in FIG. 4 may be generated and output when the zoom level is altered such that the geographical area visible in the map becomes less than a threshold. I.e., a transition from a map as shown in FIG. 3 to a map as shown in FIG. 4 may be initiated based on a threshold comparison of the zoom level.

In the electronic map 36, an object previously represented as icon 31 is displayed by performing 3D rendering, to thereby generate a rendered 3D object representation 37 of the object. The icon 31 is hidden. While rendering must be performed to generate the rendered 3D object representation 37 of the object, rendering must typically be performed only when the number of objects is not too large. For illustration, in some implementations, 3D maps showing rendered 3D object representations 37 of landmarks may be generated only when the number of landmarks in the field of view becomes less than a threshold.

For yet other maps output by the navigation device under the control of the processor, the map may include at least one object shown as icon and at least one other object shown as rendered 3D object representation. This may be suitable when the zoom level is still such that there are many landmarks positioned in the field of view, but one of the landmarks has a distance from the point of view which is less than a threshold, so that this object should be shown in a more realistic manner.

When the way in which an object is displayed must be modified from an icon representation to a rendered 3D object representation, the pointer 27 stored in the second data for this object may be utilized. The pointer 27 may be used to more rapidly retrieve the 3D representation of the respective object for rendering. For illustration, when a zoom operation is performed so as to zoom in to a given area, a reference pointing to the parent object in the first data may be used to retrieve the 3D representation from the first data.

Referring to FIGS. 3 and 4, when a user zooms in to an area in which the object represented by icon 31 is located, the pointer of the geo-referenced entry in the second data may be used to identify the 3D object representation stored in the first data for which 3D rendering is to be performed.

The database including the first data and the second data may have any one of a variety of configurations, as will be described in more detail with reference to FIGS. 5-8.

Figure 5:
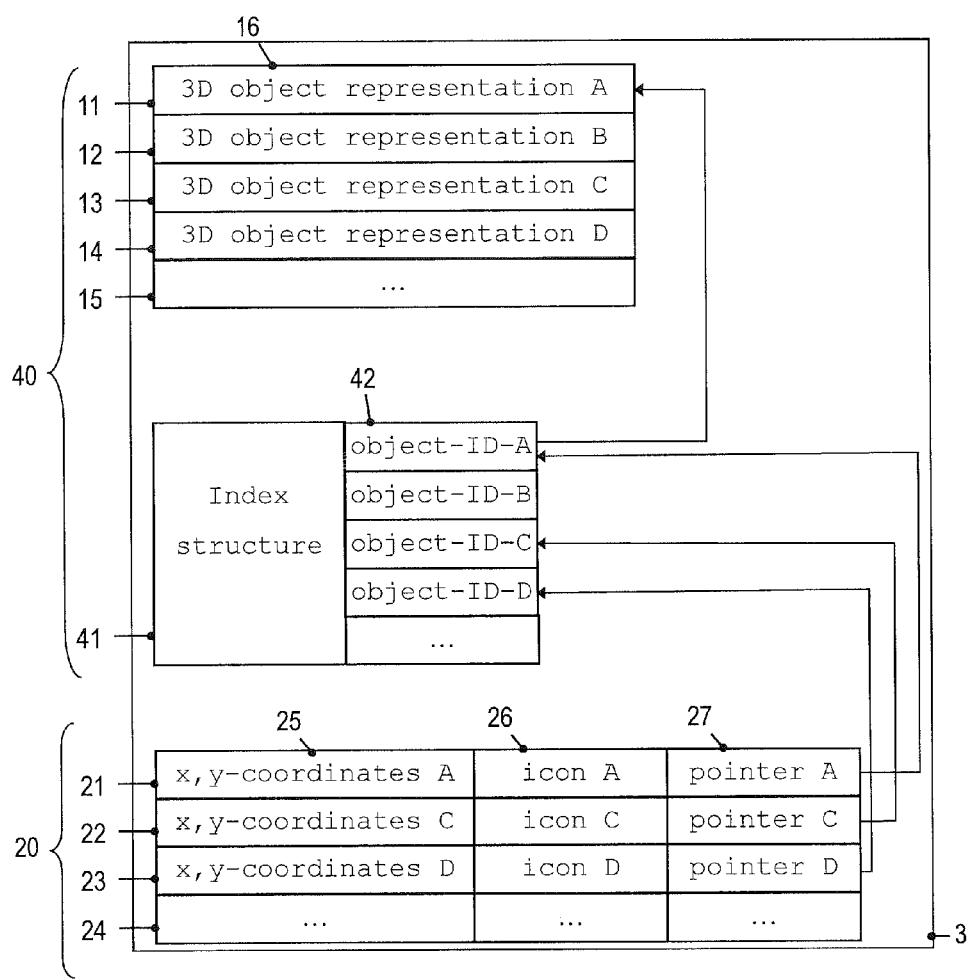
FIG. 5 is a schematic representation of a database of another embodiment.

FIG. 5 shows a database 3 for use in a navigation device according to another embodiment. The database 3 may be used in the navigation device 1 of FIG. 1.

The database 3 includes second data 20 with entries 21-24, which define geo-referenced icon representations and additionally include pointers to specific entries of the first data 40.

The first data 40 includes an index structure 41. The index structure 41 may be a search tree. The index structure 41 may be an R-tree. The index structure 41 may have leaf nodes 42, which respectively point to a 3D object representation.

The first data 40 may include a separate table having entries 11-15 which define the 3D object representations of plural objects. If two objects have identical 3D object representations, more than one leaf node of the index structure 41 may point to one and the same 3D object representation, i.e., to the same entry 11-15. The 3D object representations may have any one of a variety of formats defining a surface mesh, such as TINs or similar.

The index structure 41 may generally be used to identify the 3D object representations which must be rendered for outputting a 3D map. For illustration, if outputting of a map is started at a zoom level at which the displayed area is already small, an object may be displayed by performing 3D rendering using the first data 40. By allowing the pointers of the second data 20 to reference nodes of the index structure 41, a unified processing may be used. The 3D object representations are retrieved via the index structure 41 even when an icon representation of an object has previously been displayed.

In other implementations, the pointers of the second data 20 may directly point to one of the entries 11-15 defining 3D object representations.

If the pointers of the second data 20 point to the index structure 41, it is not required for all of them to point to leaf nodes. Some, or all, of the pointers may point to nodes of the index structure which are neither leaf nodes nor the root node. This may be useful if the index structure is used to access different alternative 3D object representations of one object, such as a day view and night view representation which may be different in terms of surface textures.

Figure 6:
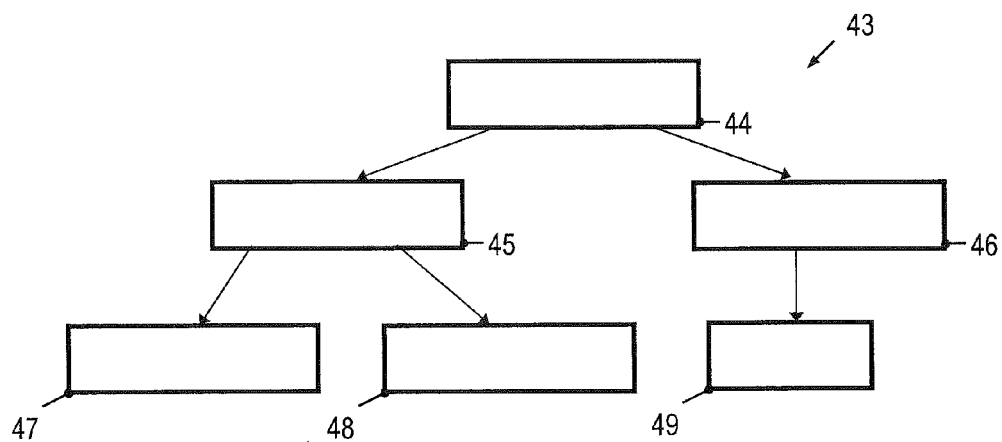
FIG. 6 illustrates an index structure of first data stored in the database of an embodiment.

FIG. 6 schematically illustrates the structure of a search tree 43. The index structure 41 may be organized as a search tree having such a configuration.

The search tree 43 includes a root node 44 and leaf nodes 47-49. Additional branching nodes 45, 46 may be positioned between the root node 44 and the leaf nodes 47-49. The pointers of the second data 20 may point to leaf nodes 47-49 or to branching nodes 45, 46, which are not the root node of the search tree 43. Data may be retrieved in an efficient manner when performing 3D rendering.

Figure 7:
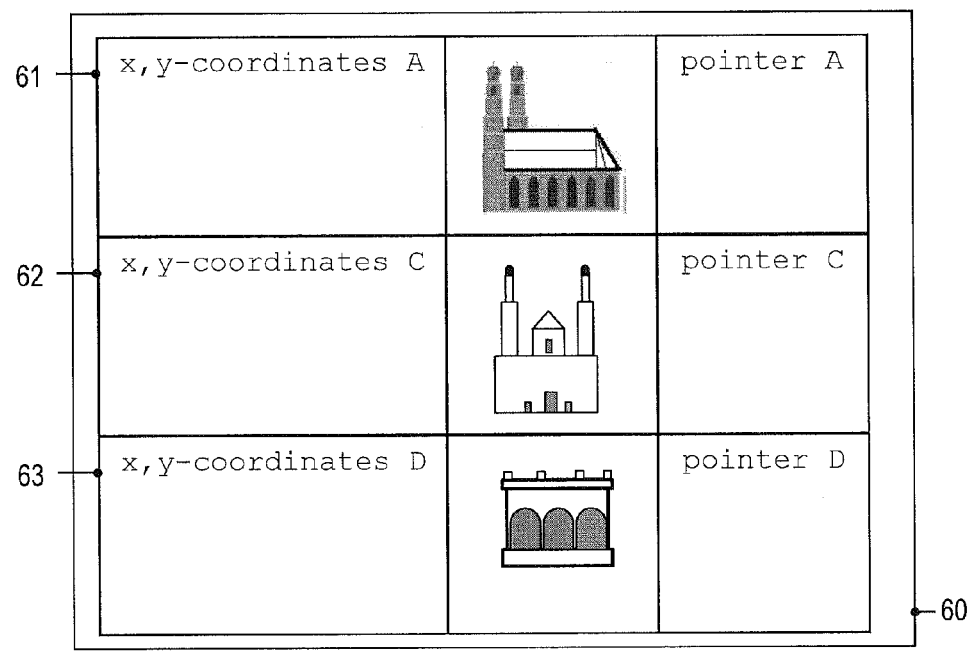
FIG. 7 is a schematic representation of second data stored in the database of an embodiment.

FIG. 7 schematically illustrates the structure of second data 60 of a database according to an embodiment. The second data 60 include a table which has a plurality of entries 61-63, each of which is associated with an object.

For objects for which an icon representation is stored, the table has the following entries: An entry defining the position of the respective object (labelled object "A", "C", "D" in FIG. 7). The position may be defined by a pair of geo-coordinates. Another entry defines the image data for the respective icon. The image data may have any one of a variety of formats, such as bitmap, tagged image file format, portable network graphics, jpeg data, or any one of a variety of other formats. Yet another entry respectively defines a reference to a portion of the first data, which is specifically associated with the respective object. The pointer may be a pointer to data defining a 3D object representation of this object. The pointer may also be a pointer to a specific portion of an index structure. For illustration the pointer may be a pointer to a leaf node of an index structure, or to another node which is different from the root node, and which is specifically associated with the respective object.

Figure 8:
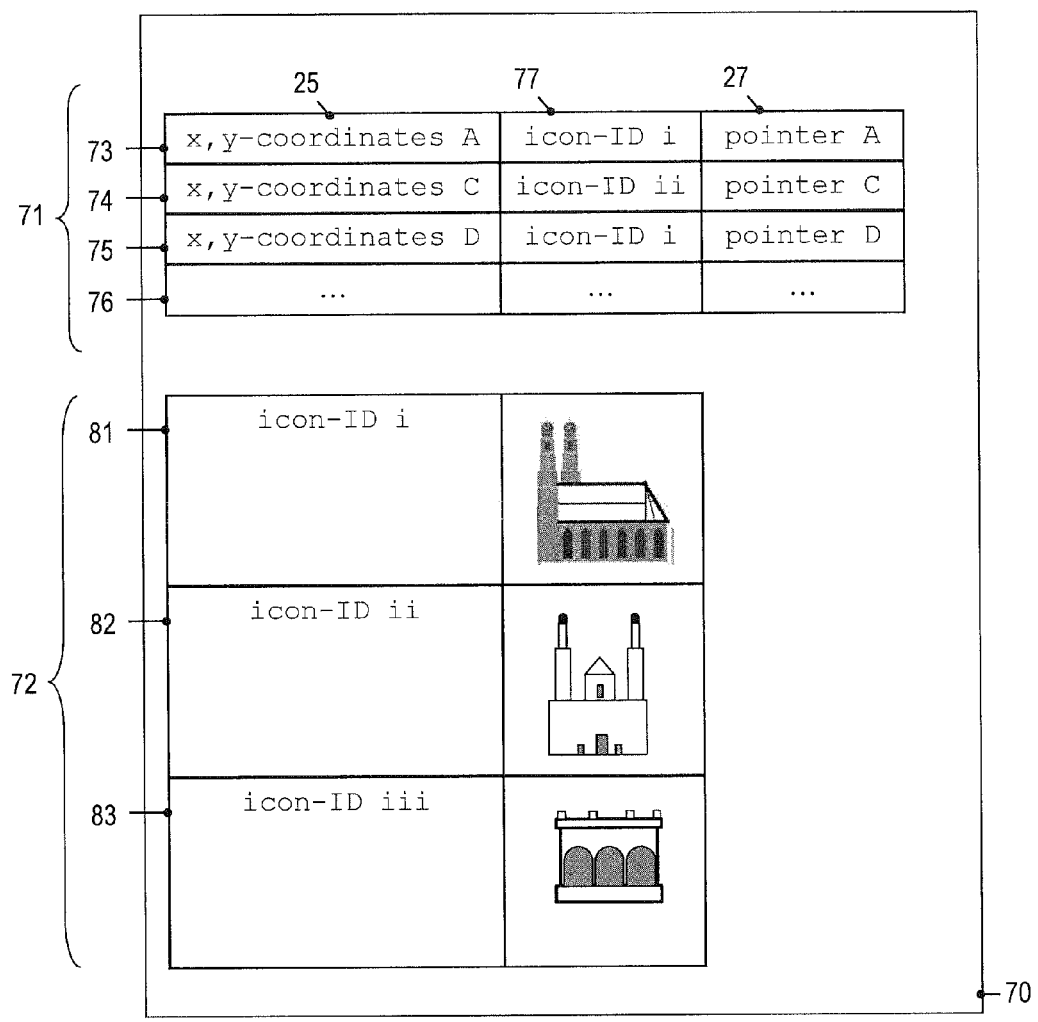
FIG. 8 is a schematic representation of second data stored in the database of another embodiment.

FIG. 8 schematically illustrates the structure of second data 70 of a database according to an embodiment. The second data 70 include a first table 71 and a second table 72.

The first table 71 includes a plurality of entries 73-75, each of which is associated with an object for which an icon representation is stored. Additional entries 76 may be used as appropriate, in accordance with the number of objects for which icon representations are stored. For each one of these objects, the first table 71 has the following entries: An entry 25 defining the position of the respective object (labelled object "A", "C", "D" in FIG. 8). The position may be defined by a pair of geo-referenced coordinates. Another entry 77 includes an icon identifier, identifying one of plural different icons. Yet another entry 27 respectively defines a reference to a portion of the first data, which is specifically associated with the respective object, as explained above.

The second table 72 includes the plural icons. The second table 72 has a plurality of entries 81, 83, each being associated with respectively an icon. Icon identifiers may be included in the second table. Icon identifiers do not need to be included in the second table if the icons are stored therein in a consecutive manner, in accordance with their identifiers. For illustration, the second table 72 may include as many entries as there are different icons, with each entry defining one of the icons as image data. The image data may have any one of a variety of formats, such as bitmap, tagged image file format, portable network graphics, jpeg data, or any one of a variety of other formats.

One and the same icon-identifier (such as icon identifier "icon-ID i" in FIG. 8) may be present in plural entries of the first table 71. Different objects may still be reasonably represented by the same icon, at least at upper zoom levels at which the icons are used. This may apply, for example, to generic icons such as icons representing churches or television towers. Storage space requirements may be reduced when the icon is not stored in duplicate in such instances. The second data 70 may allow storage space requirements to be kept moderate.

Figure 9:
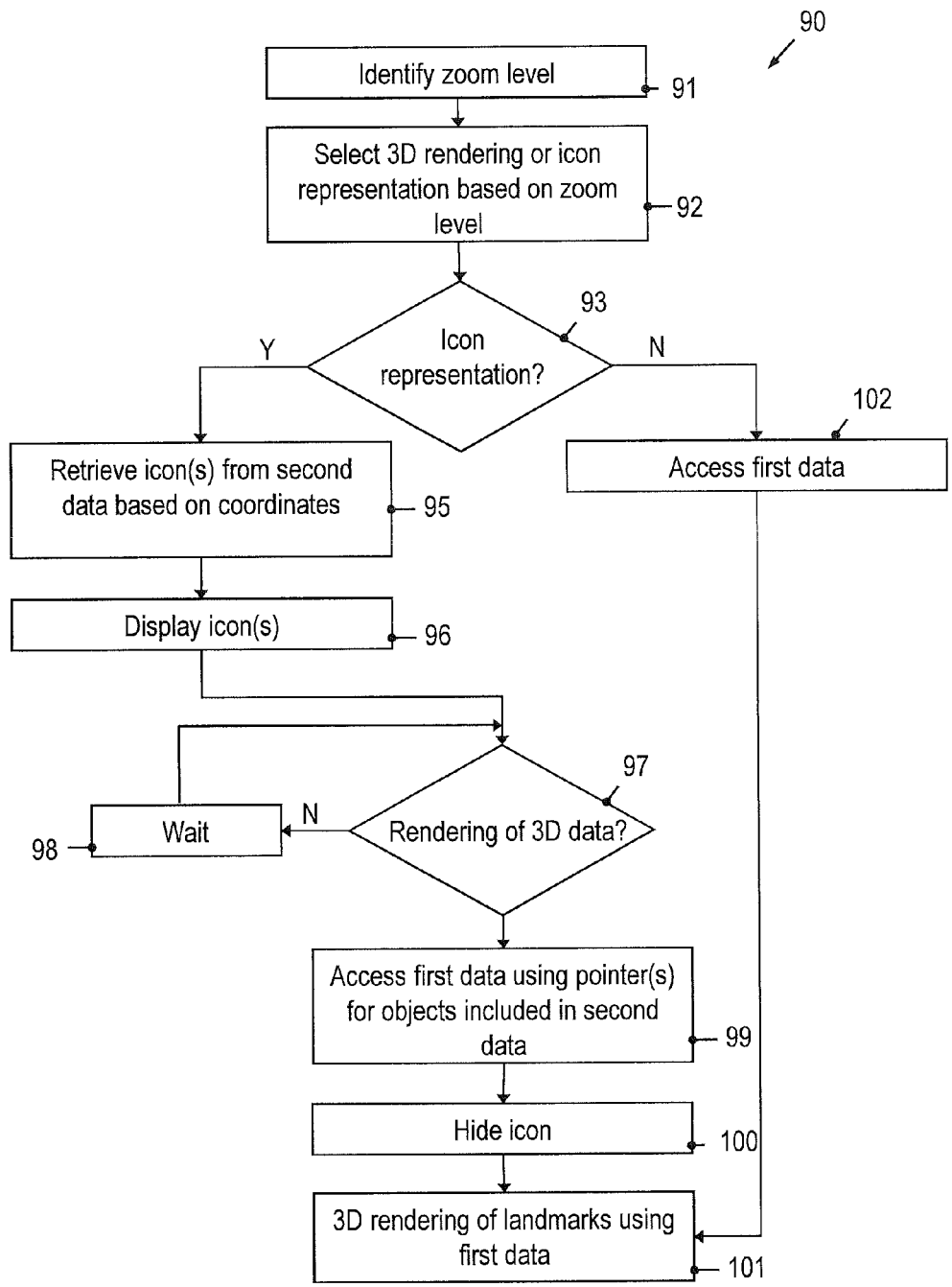
FIG. 9 is a flow chart illustration of a method of outputting a map according to an embodiment.

FIG. 9 is a flow chart illustration of a method 90 of outputting a map. The method may be used to output a 3D map. The method 90 may be performed by the processing device 2 (FIG. 1). The processing device 2 may control the output interface 4 for optically outputting a 3D map, and may adapt the 3D map when a zoom level is altered. The method 90 may use a database having first data and second data, as described with reference to FIGS. 1-8.

In the method 90, objects are shown on a map by respectively either simply displaying an icon or by performing 3D rendering. A transition may be made between icon representation and rendered 3D object representation, based on whether or not a pre-determined criterion is fulfilled. The criterion may involve a threshold comparison of a zoom level.

At step 91, a zoom level is identified. The zoom level may be set by a user. The zoom level may also be set automatically by the processing device 2 (FIG. 1).

At step 92, it is determined whether one or plural objects are to be displayed by rendering a 3D object representation or by displaying an icon. When an icon is displayed, no 3D rendering must be performed. A selection may be made based on, for example, the zoom level identified at step 91. Other criteria may be used in addition or alternatively, such as distances of the objects from a point of view used to generate the 3D map. The selection at step 92 may be performed so as to apply to all objects shown on the map, or may be done individually for each object, thus allowing some objects to be displayed by performing 3D rendering and allowing other objects to be represented by icons.

At step 93, it is determined whether an icon representation is to be output. If an icon representation is to be output for an object, the method proceeds to step 95. Otherwise, the method proceeds to step 102.

At step 95, an icon is retrieved from the second data for each object which is to be displayed as an icon. The icons which must be retrieved are identified based on the geo-coordinates stored in the second data. If a plurality of icons are available for one object, such as an icon for day view and another icon for night view, one of the icons may be selected, for example as a function of daytime.

At step 96, the icon(s) are displayed. The position of the icons on the map is selected based on their coordinates. However, the icons may not have to be adjusted as a viewing direction changes.

At step 97, after icon(s) have been displayed, a pre-determined criterion is monitored to determine whether one or plural of the icons are to be replaced by more realistic views, generated by rendering 3D object representations. The pre-determined criterion may be based on a threshold comparison of the zoom level. For illustration, when the zoom level is such that the geographical area represented on the map reaches a threshold or is less than a threshold, icon(s) may be replaced by rendered 3D object representations. The pre-determined criterion may be based on a threshold comparison of the object distance. For illustration, when the distance of an object from the point of view reaches a threshold or is less than a threshold, icon(s) may be replaced by rendered 3D object representations. The criteria may also be employed cumulatively. For illustration, the zoom level may be used to set the threshold applied when determining whether an object is so close that it should be displayed by 3D rendering of the associated 3D object representation. Alternative or additional criteria may be used to determine whether icon(s) are to be replaced by rendered graphics. The criteria may also involve available processing resources. For illustration, if available computation resources are too low, 3D rendering may be postponed even if a user zooms in towards an object. 3D rendering may be performed when the available processing resources allow the 3D rendering to be performed in an acceptable time.

If it is determined that no 3D rendering is to be performed, the monitoring at 97 is continued, possibly after a wait time at step 98.

If it is determined that 3D rendering is to be performed for an object which is presently displayed as an icon, the method continues at step 99.

At step 99, the first data defining 3D representations of objects are accessed. The first data is accessed using the pointer(s) stored in the second data. The pointer is retrieved for an object for which a displayed icon is to be replaced by a rendered 3D object representation.

At step 100, the icon is hidden.

At step 101, 3D rendering of the 3D representation of object(s) is performed. The rendered 3D object representation is displayed. Thereby, an icon is replaced by a view of the object which is obtained by rendering the 3D representation of the object. Generally, the rendered 3D object representation will take into account the viewing direction. The rendered 3D object representation may be adapted as a function of viewing direction when the viewing direction changes, thereby enhancing recognition quality.

If it is initially determined, at step 93, that no icon representation is to be output, the method proceeds to step 102. At step 102, the 3D representation data is retrieved from the first data. The method proceeds to the rendering at step 101, to display the rendered 3D object representations of the objects.

The objects may be landmarks.

The second data of the database which may be used in the method 90 of FIG. 9 may be generated at compile time of the database.

Figure 10:
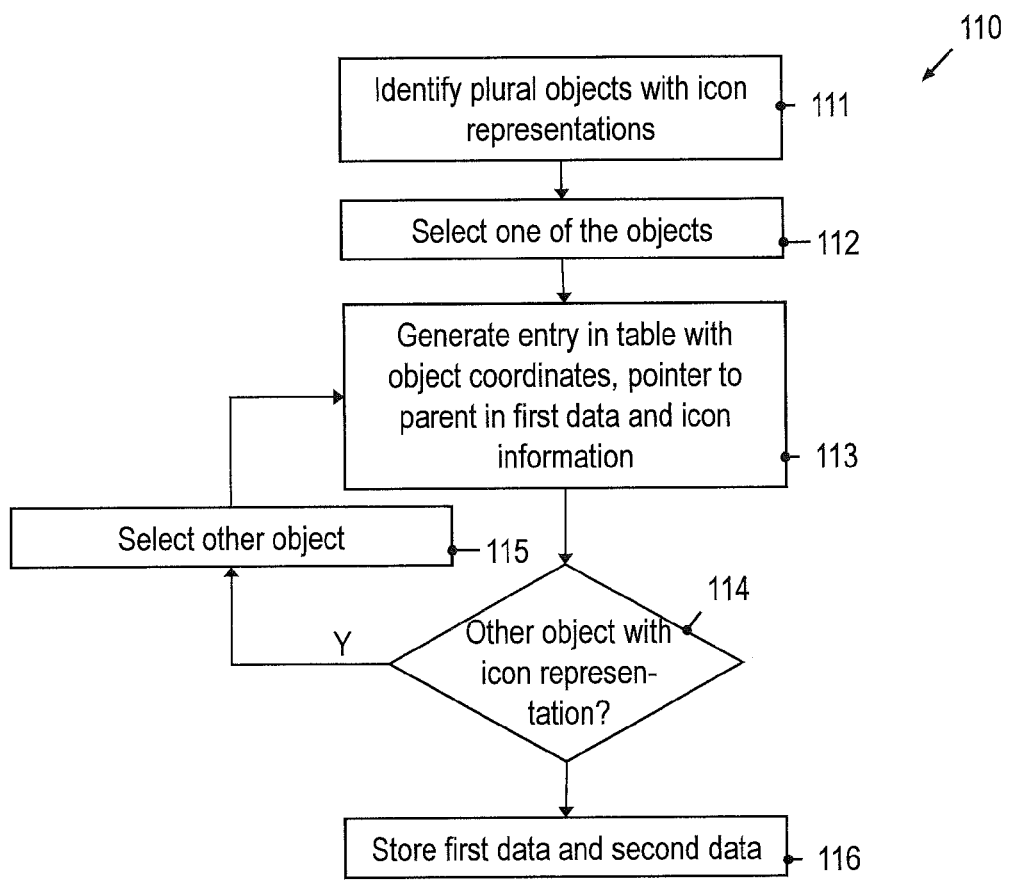
FIG. 10 is a flow chart illustration of a method of generating a database according to an embodiment.

FIG. 10 is a flow chart of a method 110 of generating a database for use in a navigation device. The method 110 may be used to generate the database which is used in the method 90, or to generate the database which is used in the navigation device 1 (FIG. 1). The method 110 may be performed on a server computer which is separate from a vehicle navigation device, even if the database is subsequently deployed to a vehicle navigation device. The method 110 may be performed at compile-time, when the first data defining three-dimensional object representations is also generated.

At step 111, plural objects are identified for which icon representations are available. The plural objects identified at step 111 may be all objects for which information on 3D representations, such as a surface mesh, is stored in the database. The plural objects identified at step 111 may also be a subset of the objects for which information on 3D representations, such as a surface mesh, is stored in the database.

The identifying at step 111 may be made in a user-defined manner. For illustration, an operator may assign one of plural icons to objects prior to compilation of the database. In this case, the identified objects for which icon representations are to be stored are those objects to which an icon has been assigned.

At step 112, one of the identified objects is selected.

At step 113, entries are generated in a table. The generated entries include: geo-referenced coordinates of the object, a pointer to a parent in the first data, and information defining an icon representation of the object.

The pointer to the parent may be a pointer to a portion of the first data which is specifically associated with the respective object, thereby facilitating a transition between map views in which the object is shown as icon or by rendering of a 3D representation. The pointer may be a pointer to a node of an index structure, which is different from a root node.

The information defining an icon representation may be image data. Alternatively, the information defining an icon representation may include an identifier for image data, and the image data may be stored separately from the table in the second data.

At step 114, it is determined whether there is another object for which an icon representation is to be stored. If there is another object, the other object is selected at step 115 and the method returns to step 113.

If table entries have been generated for all objects for which an icon representation is to be defined, the method proceeds to step 116. At step 116, the first data defining the 3D representations of the objects and the second data defining geo-referenced icon representations may be stored.

While devices and methods according to embodiments have been described in detail, modifications may be implemented in other embodiments. For illustration, while embodiments using a database which includes several tables have been described in detail, other database structures may be used.

For further illustration, while embodiments have been described in detail in which a decision on whether an icon is to be output or 3D rendering is to be performed is taken as a function of zoom level, other criteria may be employed.

For further illustration, the information defining the 3D object representation may have any one of a variety of formats. While TINs were described, any other format may be used. In particular, any other representation defining a surface mesh may be used.

Embodiments of the invention may be used for navigation devices. Embodiments of the invention may in particular be used for vehicle navigation devices.

Although the present invention has been illustrated and described with respect to several preferred embodiments thereof, various changes, omissions and additions to the form and detail thereof, may be made therein, without departing from the spirit and scope of the invention.

What is claimed is:

1. A navigation device, comprising:
a database storing
first data defining, for a plurality of objects, respectively a three-dimensional representation of the object, and
second data including, for at least a subset of said plurality of objects, an icon representation of the respective object, coordinates of the respective object and a pointer to a portion of said first data which is associated with the respective object; and
a processing device coupled to said database and configured to control an optical output device based on said first data and said second data,
wherein said processing device is configured to access, for an object included in said subset, said first data using said pointer included in said second data, in order to retrieve data defining said three-dimensional representation.

2. The navigation device of claim 1,
wherein said processing device is configured to alter said control of the optical output device as a function of a zoom level of a displayed map, so as to switch between said icon representation and said three-dimensional representation for an object based on the zoom level.

3. The navigation device of claim 1,
wherein said processing device is configured to monitor a pre-determined criterion and to selectively control, as a function of said pre-determined criterion, said optical output device to one of display said icon representation for an object or display said three-dimensional representation for said object.

4. The navigation device of claim 3,
wherein said pre-determined criterion is based on a zoom level.

5. The navigation device of claim 3,
wherein said processing device is configured to control, in response to a change in zoom level, said optical output device to hide said icon representation and to display said three-dimensional representation for said object.

6. The navigation device of claim 1,
wherein said processing device is configured to control said optical output device to display said icon representations for a plurality of objects, and to retrieve data defining said three-dimensional representation for only a fraction of said plural objects in response to a change in zoom level.

7. The navigation device of claim 6,
wherein said icon representations for said plurality of objects are selected based on said coordinates included in said second data.

8. The navigation device of claim 1,
wherein said first data include an index structure having a plurality of nodes, and
wherein said pointer is respectively a pointer to a node of said index structure which is different from a root node.

9. The navigation device of claim 8,
wherein said index structure includes an R-tree.

10. The navigation device of claim 8,
wherein said pointer is a pointer to a leaf node of said index structure.

11. A method of outputting a map using a database, said method comprising:
identifying at least one object to be displayed on said map;
retrieving information selectively from first data or from second data stored in said database, said first data including three-dimensional representations of objects, and said second data including, for at least a subset of said objects, a geo-referenced icon representation for the respective object and a pointer to a portion of said first data which is associated with the respective object; and
controlling an optical output device based on said retrieved information,
wherein the step of retrieving information includes using said pointer included in said second data, in order to retrieve data defining said three-dimensional representation.

12. The method of claim 11, further comprising:
monitoring a pre-determined criterion to determine whether a representation of said object is to be generated based on said first data, after an icon representation was output for an object, and
selectively accessing a portion of said first data using said pointer stored in said second data for said object.

13. The method of claim 12,
wherein said monitoring said pre-determined criterion includes monitoring a zoom level.

14. The method of claim 11, further comprising:
switching between said icon representation and said three-dimensional representation for an object as a function of a monitored zoom level.

* * * * *